US008549268B2

(12) United States Patent
Hunter et al.

(10) Patent No.: US 8,549,268 B2
(45) Date of Patent: *Oct. 1, 2013

(54) COMPUTER-IMPLEMENTED METHOD OF PROCESSING RESOURCE MANAGEMENT

(75) Inventors: Hillery C Hunter, Deerfield, IL (US); Ronald P Luijten, Thatwil (CH); Phillip Stanley-Marbell, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/599,102

(22) Filed: Aug. 30, 2012

(65) Prior Publication Data

US 2012/0324166 A1 Dec. 20, 2012

Related U.S. Application Data

(63) Continuation of application No. 12/635,544, filed on Dec. 10, 2009.

(51) Int. Cl.
*G06F 9/48* (2006.01)
(52) U.S. Cl.
USPC .......................................... 712/228; 718/108
(58) Field of Classification Search
None
See application file for complete search history.

(56) References Cited

U.S. PATENT DOCUMENTS

| | | | | |
|---|---|---|---|---|
| 6,105,053 A * | 8/2000 | Kimmel et al. | ............... | 718/105 |
| 7,093,147 B2 * | 8/2006 | Farkas et al. | ................... | 713/320 |
| 2007/0156963 A1 * | 7/2007 | Chen et al. | ..................... | 711/130 |
| 2007/0294693 A1 * | 12/2007 | Barham | ......................... | 718/102 |
| 2008/0127182 A1 * | 5/2008 | Newport et al. | .................. | 718/1 |
| 2009/0157945 A1 * | 6/2009 | Arimilli et al. | ............... | 711/100 |
| 2009/0172424 A1 * | 7/2009 | Cai et al. | ....................... | 713/300 |

OTHER PUBLICATIONS

Brown et al. "The Shared-Thread Multiprocessor." Proceedings of the 22nd Annual International Conference on Supercomputing, (2008), pp. 73-82.
Elliott et al. "Computational RAM: A Memory-SIMD Hybrid and Its Application to DSP." Proceedings of the IEEE 1992 Custom Integrated Circuits Conference, (1992), pp. 30.6.1-30.6.4.
Gokhale et al. "Processing in Memory: The Terasys Massively Parallel PIM Array." Computer, vol. 28, Issue 4, (Apr. 1995), pp. 23-31.
Kogge "Execube: A New Architecture for Scalable MPPs." Proceedings of the International Conference on Parallel Processing, (Aug. 1994), pp. 77-84.
Patterson et al. "Intelligent RAM (IRAM): Chips that Remember and Compute." ICCD '97 International Conference on Computer Design, (Oct. 1997), 27 pages.
Stanley-Marbell et al. "Adaptive Data Placement in an Embedded Multiprocessor Thread Library." Proceedings of the Conference on Design, Automation and Test in Europe, (2006), pp. 698-699.

(Continued)

*Primary Examiner* — Eric Coleman
(74) *Attorney, Agent, or Firm* — Jeffrey T. Holman

(57) ABSTRACT

A computer-implemented method for managing processing resources of a computerized system having at least a first processor and a second processor, each of the processors operatively interconnected to a memory storing a set of data to be processed by a processor, the method comprising: monitoring data accessed by the first processor while executing; and if the second processor is at a shorter distance than the first processor from the monitored data, instructing to interrupt execution at the first processor and resume the execution at the second processor.

22 Claims, 5 Drawing Sheets

(56) References Cited

OTHER PUBLICATIONS

Tsubota et al. "The M32R/D, A 32b RISC Microprocessor with 16Mb Embedded DRAM." Mitsubishi Electric Advance, Issue 75, (1996), pp. 12-15.

"Transputer." available at http://en.wikipedia.org/wiki/Transputer, last accessed Dec. 10, 2009, 10 pages.

"J—Machine." available at http://en.wikipedia.org/wiki/J%E2%80%93Machine, last accessed Dec. 10, 2009, 1 page.

* cited by examiner

COMPUTER-IMPLEMENTED METHOD OF PROCESSING RESOURCE MANAGEMENT

CROSS-REFERENCE TO RELATED APPLICATIONS

This application is a continuation of U.S. application Ser. No. 12/635,544, filed on Dec. 10, 2009, which is incorporated by reference herein in its entirety.

BACKGROUND

Computers are machines that process data according to instructions. Today, they are mostly configured such as to distribute their work across several CPUs, providing multiprocessing capabilities. Multiprocessor and multi-core systems are now available for personal and laptop computers and not anymore restricted to supercomputers, mainframe computers or servers. Yet, the largest computers still benefit from unique architectures that significantly differ from the usual computers. For instance, they often feature thousands of processors, high-speed interconnects, and specialized hardware.

Be it in a multiprocessor context or not, a challenge for computer systems is to improve their global performances and this, while reducing aggregate power consumption. Besides, most CPUs today tend to spend time waiting for memory, I/O, graphics, etc., such that that improving the sole CPU instruction execution performances is not anymore the main possible axis of development.

For instance, a paper of Brown, J. A. and Tullsen, D. M (The shared-thread multiprocessor. In *Proceedings of the 22nd Annual international Conference on Supercomputing* (Island of Kos, Greece, Jun. 7-12, 2008). ICS '08. ACM, New York, N.Y., 73-82. DOI=http://doi.acm.org/10.1145/1375527.1375541), describes results for an architecture of shared-thread multiprocessor (STMP). The STMP combines features of a multithreaded processor and a chip multiprocessor. Specifically, it enables distinct cores on a chip multiprocessor to share thread state. This shared thread state allows the system to schedule threads from a shared pool onto individual cores, allowing for rapid movement of threads between cores. The paper demonstrates and evaluates benefits of this architecture.

Other approaches focus on:

Multiple processors integrated into structure of memory array, see e.g. Duncan G. Elliott, W. Martin Snelgrove, and Michael Stumm. Computational RAM: A Memory-SIMD Hybrid and its Application to DSP. In Custom Integrated Circuits Conference, pages 30.6.1-30.6.4, Boston, Mass., May 1992;

Multiple processors and memory macros integrated onto a chip (PIM), see e.g. Maya Gokhale, Bill Holmes, and Ken Iobst. Processing in Memory: the Terasys Massively Parallel PIM Array. Computer, 28(3):23-31, April 1995;

Multiple processors and memory macros integrated onto a chip (Execube), see e.g. Peter M. Kogge. EXECUBE—A New Architecture for Scalable MPPs. In 1994 International Conference on Parallel Processing, pages I77-I84, August 1994; and IRAM, see e.g. David Patterson, Thomas Anderson, Neal Cardwell, Richard Fromm, Kimberly Keeton, Christoforos Kozyrakis, Randi Thomas, and Katherine Yelick. Intelligent RAM (IRAM): Chips that Remember and Compute" Presented at the 1997 IEEE International Solid-State Circuits Conference (ISSCC) 6-8 Feb. 1997, San Francisco, Calif.

SUMMARY

Embodiments of a computer-implemented method for managing processing resources of a computerized system are described. In some embodiments, the computerized system includes at least a first processor and a second processor, each of the processors operatively interconnected to a memory adapted to store a set of data. In one embodiment, the computer-implemented method includes monitoring data of a set which are processed as at least one of input data or output data by the first processor while executing. The computer-implemented method also includes instructing to interrupt an execution at the first processor and resume the execution at the second processor if, based on the monitoring, the second processor is found to be at a shorter distance than the first processor from the monitored data.

Embodiments of another computer-implemented method for managing processing resources of a computerized system are described. In some embodiments, the computerized system includes a plurality of processors, amongst which a first processor and a second processor, each of the processors operatively interconnected to a memory adapted to store a set of data to be processed by a processor. In one embodiment, the computer-implemented method includes monitoring data of the set which are processed as at least one of input data or output data by the first processor while executing. Furthermore, if the second processor is found to be closer than the first processor to the monitored data, then the computer-implemented method includes instructing to interrupt an execution at the first processor, the first processor in a given processor state, and resume the execution at the second processor, starting from a processor state at least partly determined by the given processor state.

Other aspects and advantages of embodiments of the present invention will become apparent from the following detailed description, taken in conjunction with the accompanying drawings, illustrated by way of example of the principles of the invention.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

In some embodiments, a computer-implemented method for managing processing resources of a computerized system breaks a classical paradigm according to which processors are the center of the world and input/output data are brought to/from the processors. On the contrary, embodiments of the computer-implemented method propose to move the "compute" state information to where the data is, e.g. by moving a core state to a closest core, instead of moving data to CPU. Basically, this results in moving Kbytes instead of Mbytes in practice.

To arrive at this reversed paradigm, the present inventors have realized the following:

A substantial amount of power is used in moving data;
Half the power consumed on e.g. dual in-line memory module (DIMM) is in input/output (I/O);
Putting more cores on a single large die cannot be continued for a long time, let alone the bandwidth-per-core problem, the power consumption and cooling challenges; and
Caches use a lot of area and power;

Accordingly, the cost of moving the data becomes a more substantial problem than moving the compute, hence the benefit of the present approach.

Figure 1:
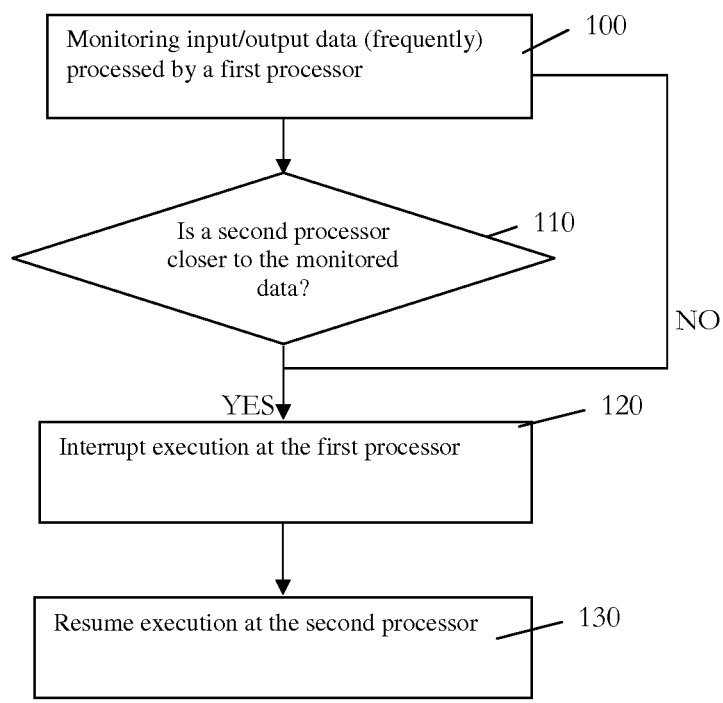
FIG. 1 is a flowchart of one embodiment of a method for managing processing resources of a computerized system.

FIG. 1 is a flowchart of one embodiment of a method for managing processing resources of a computerized system. The method aims at proposing a new way of management of processing resources in a computerized system wherein several processors are operatively interconnected to a memory. The latter is adapted to store a set of data, which may be used by one or more of the processors. Typically, the data at stake is read ('input data') and/or generated by the core and written back ('output data'). The method comprises two major steps, which are discussed now.

For the sake of simplicity, consider two processors only for the time being.

First, input and/or output data processed by a first one of the processor are monitored, step 100.

Second, if a second processor is found to be at a shorter distance than the first processor from the monitored data (test 110), execution at the first processor is interrupted, step 120, and the execution is resumed at the second processor, step 130. Thus, data are accessed/generated from a closer processor, thereby avoiding unnecessary longer distance data movements to/from the first processor (or a L1-L3 cache thereof).

More generally, data accessed by N processors are simultaneously monitored. The purpose of the flowchart of FIG. 1 is to provide a high-level view on the invention, for the sake of understanding.

As said, the data monitored can be input and/or output data. However, embodiments hereafter are based on examples of monitoring input data only, i.e. data read by the processor, for the sake of simplicity only. Yet, be it input and/or output data, principles of the invention remain the same.

Instruction is resumed at a processor that is at a shorter distance from the monitored data. The distance at issue can for instance be a measure of how far a processor is from the data it processes. For example, in an embodiment discussed below, CPU cores are on 3D stacks with memory: here the distance from a given core to its respective memory is physically short, whereas distance to the memory of another 3D stack is much larger. More generally, the distance at issue reflects a cost, e.g. a cost of energy or time.

For example, the farther the data, the more power consumption it requires to transport them (whence the cost).

The distance may further reflect a cost of time. In this regard, the distance considered can vary like a latency (or an expected latency) of data to reach a given processor. Latency (i.e. access time) is the time the memory delays in providing back data that a processor asks for. Roughly, the farther to a processor, the longer it takes to reach it. Waiting reduces the processor performance: if a processor has to wait five memory clock cycles to receive data it asks for, its performance will only be ⅕ of the performance it would have if it were using memory capable of immediately delivering data. Thus, resuming execution at a closer processor may result in better performances.

For instance, the distance to given data can be estimated based on their memory addresses and the processor locations.

Furthermore, monitoring input data accessed by a first processor may be carried out based on the memory addresses of the input data as stored on interconnects, e.g. a bus. For example, the last 100 memory addresses accessed are monitored. If it turns that e.g. a majority of the monitored addresses pertains to a memory or a memory sector closer to a second processor, then it is decided to resume execution at the second processor. Monitoring which data is accessed by a processor can else be performed via the processor's registers or other means.

For example, the distance can be determined as a vector involving several data read/written by the first processor (e.g. the last 100 read/write memory addresses), in order to determine whether the second processor is closer than the first processor.

Decision as to whether to move execution to another processor can be made at one or more controllers. The controllers at stake can be software, or hardware, e.g. a hardware circuit. In the latter case, the hardware circuit is suitably interconnected to both the processors and memory (e.g. via one or more switches). The control logic may further be centralized (one controller decides) or distributed, i.e. several controllers (e.g. one per processor) may competitively decide, as shall be illustrated later.

Consider the following example, to clarify ideas. A first processor P1 is asked to execute some code. Execution of the code requires, at some point, addition of two (very) large numbers, N1 and N2 (i.e. input data), it being noted that the addition at stake could very well be effected in one cycle if sufficiently small numbers were instead involved. We assume that the code executed at P1 reflects an algorithm designed to add numbers larger than the available RAM. In the present case, when starting the addition, P1 polls its memory cache as to N1 or at least a part thereof. We consider, for simplicity, that only one cache level is present, say L1, for the present purpose. However, since N1 is very large, e.g. it occupies 8 Terabytes of memory, the memory cache does not have N1 readily available to answer P1's request (the size of a cache line is typically 64 bytes-1 Kbytes). Thus, L1 shall successively query memory locations where different parts of N1 are stored (e.g. in contiguous blocks), in order to properly feed P1 while executing. The addresses of the parts of N1 are accordingly logged e.g. in a bus (or in some other interconnect). Meanwhile, the stored addresses are monitored (the same would happen with output data, instead of input data). If such addresses correspond to a remote memory location, closer to another processor P2, then execution is moved to P2, as recited above.

Incidentally, while the example above assumes cache memory, embodiments of the method can very well apply without cache memory at all. In fact, principles of embodiments of the method remain the same if no cache is used, i.e. when a processor directly queries the input data in the memory. For instance, addresses of the queried data can be monitored in essentially the same way. Besides, registers of the processor can be contemplated as an infra-level of cache, "closer" to the processor, such that the above example extends to a case where no cache memory (in the usual sense) is relied upon.

In a variant, some of the processors may have cache memory, while one or more other processors do not. The processors having cache memory may serve to cover setup of computation at other processors, in the same way that main memory serves processor for initial cold misses. Thus, execution can begin at P1 (the latter equipped with cache), and when a more suitable processor Pn is found, moved to the latter (most suitable processors are not known beforehand).

Next, a seamless transition can for instance be achieved by resuming execution at the second processor, starting from a processor state which is (at least partly) determined by that of the first processor, i.e. when execution was interrupted.

The "processor state" usually refers to a state of the processor as reflected at some point in time by (at least) the processor registers, including e.g. the state flags. More broadly, it may refer to processor registers, latches and memory (e.g. the cache memory), or more. Typically, the code executed at the processor and input data accessed by the processor are part of a current state of this processor.

Accordingly, resuming execution at the second processor can be achieved by importing register data to the second processor, assuming the latter can interpret them (as is the case with two identical processors).

In this regard, interesting details as to how to move data between processors (though in a different context) can be found e.g. in P. Stanley-Marbell, K. Lahiri, A. Raghunathan, "Adaptive Data Placement in an Embedded Multiprocessor Thread Library," date, vol. 1, pp. 151, Proceedings of the Design Automation & Test in Europe Conference Vol. 1, 2006.

In one embodiment, a subset of the register data is imported in the second processor, in those cases where state information data are known to be partly the same. However, it remains that the state of the second processor at resuming is at least partly determined by the first (initial) processor's state. In a variant embodiment, state information data can be populated with part or all the data from processor registers of the first processor and e.g. conveniently formatted, prior to import them to the second processor.

More generally, any data suitably capturing part or all of processor states can be relied upon (hereafter state information data, or state data for short). Thus, execution at the second processor is resumed after loading some convenient state information data in the second processor, the key point remaining to move the "compute" state data to the (input/output) data, rather than moving the data to the compute. As said, this results in moving a few dozens, possibly hundreds of Kbytes in comparison to the Mbytes required when moving the (input) data accessed at processing.

Figure 2:
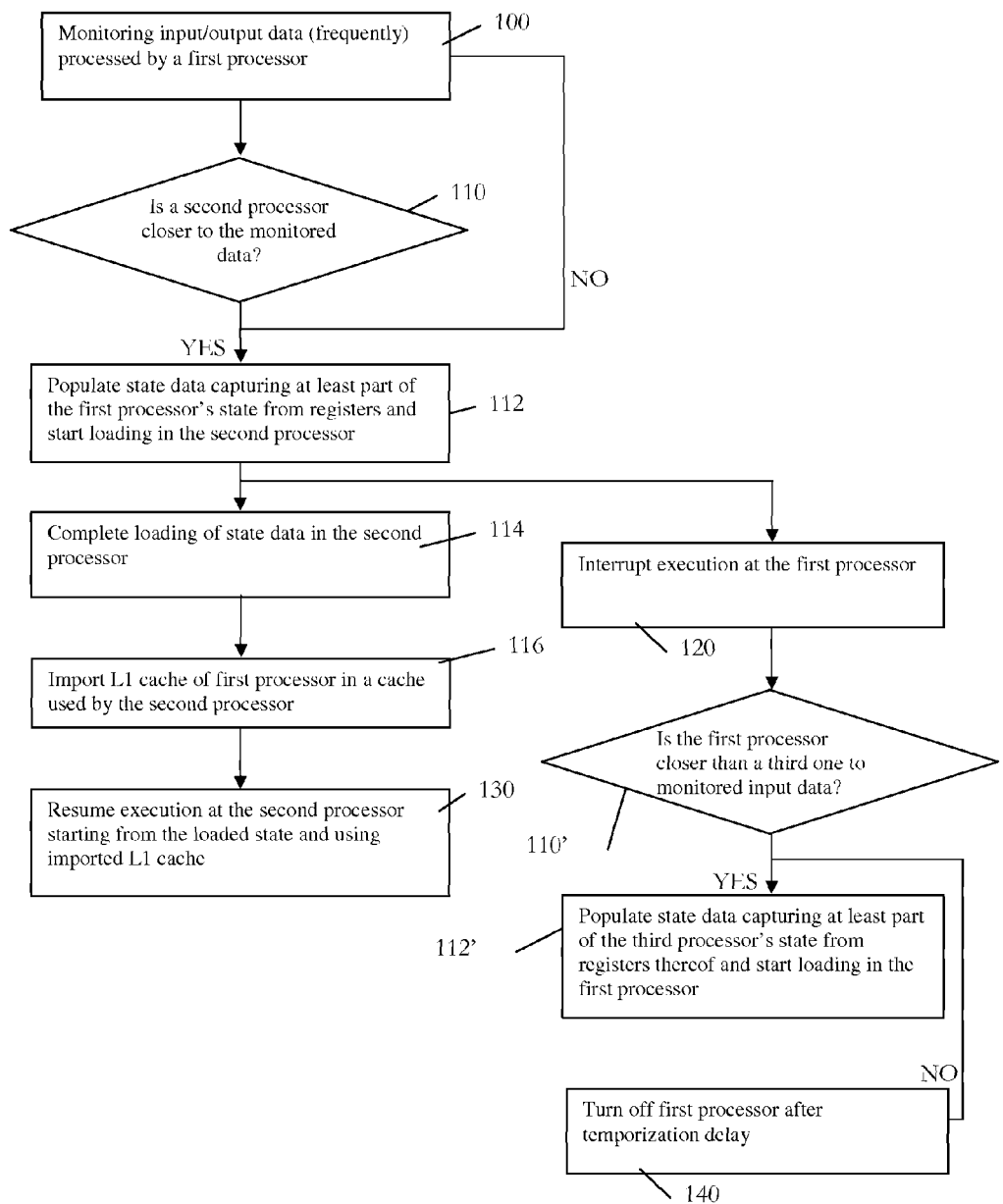
FIG. 2 is a more detailed flowchart, illustrating a specific embodiment of a method for managing processing resources of a computerized system.

FIG. 2 shows a more detailed flowchart, illustrating a detailed embodiment of a method for managing processing resources of a computerized system. In addition to steps already discussed in reference to FIG. 1, here lazy migrations can be contemplated, in order to further improve the efficiency of the scheme of the embodiment described in relation to FIG. 1. Specifically, it can be instructed to populate (step 112) state data from registers of the first processor; the loading of the populated data starting before actually interrupting execution at the first processor (steps 112, 114). For example, when a controller identifies data accessed by a (too) distant processor, it may scan the processor's registers, identify the most persistent state data and decide to move such data to a closer processor.

In a variant embodiment, an early version of the first processor's state is sent to the second processor. Upon interrupting execution at the first processor, a delta file is sent which codes the differences between the early and very last state. Thus, very few data need be moved in fine (a few Kbytes or less), ensuring fast transitions.

Furthermore, when the second processor is likely to be reused later, not all the register data need be resent the second time. The controller would accordingly instruct to migrate (steps 112, 114) state data capturing a subpart of the first processor state.

Upon completion of the migration (step 114), execution can be resumed (step 130) at the second processor.

Embodiments of the present invention allow for safely getting rid of data caches, inasmuch as high memory bandwidth allows for very short connections. Yet, it doesn't necessarily need to be so in practice.

For instance, a further refinement is obtained by migrating a cache used by the first processor, in addition to the state data. The "environment" of the first processor is thus more completely recreated at the second processor. More explicitly, data of a memory cache storing copies of the data the most frequently accessed by the first processor can be written (step 116) in a memory cache used by the second processor. The synchronization would preferably be the same as that used for the state data, for consistency.

The memory cache migrated is typically the smallest, i.e. L1 memory cache used by the first processor. More efficient, one memory cache (L1) can be relied upon, instead of the usual L1-L3 trilogy. Indeed, the high memory bandwidth achieved in embodiments of the invention allows for safely removing data caches. In addition, relying on e.g. 'through silicon via' or TSV technology allows for very short connections. Incidentally, the freed up area can be used for more cores.

Furthermore, the compute core state can itself be treated like a line in a cache. The compute core has Kbytes of state. Hence, execution can be suspended at a first processor, and core registers and L1 cache be moved to a more appropriate core.

Next, after interrupting execution at the first processor, the processor state of the first processor can be maintained until other state data are loaded therein (step 112'). This could for instance be a default behavior. Again, the controller could ensure updating the state at the first processor via a delta file, in due time and if necessary.

Possibly, the first processor can be turned off (step 140) after a temporization delay, if no new state is instructed to be loaded therein. Power consumption is thereby optimized.

Interestingly, the best suited scale of computational tasks to be interrupted and resumed depends e.g. on the reactivity of the monitoring algorithm. Finding the most efficient scale depends on the context, the number of processors, the architecture, the type of processes, tasks, the nature of the input data, etc. Provided that an efficient monitoring scheme is available, the invention is advantageously implemented at the scale of a single thread of execution. One would accordingly instruct to continue a thread of execution at the second processor (step 130) after suspending a thread of execution at the first processor (step 120).

A thread of execution can be seen as a part of a running task. For most operating systems, a thread is contained inside a process and several threads may occur within a same process, sharing resources such as memory, at variance with processes. It is known from multithreading techniques, how to make a single processor switch between different threads (as in multitasking). Similarly here, embodiments of the invention make a thread to stop at one processor. Yet, instead of resuming it at the same processor, the thread is continued at another.

Figure 3:
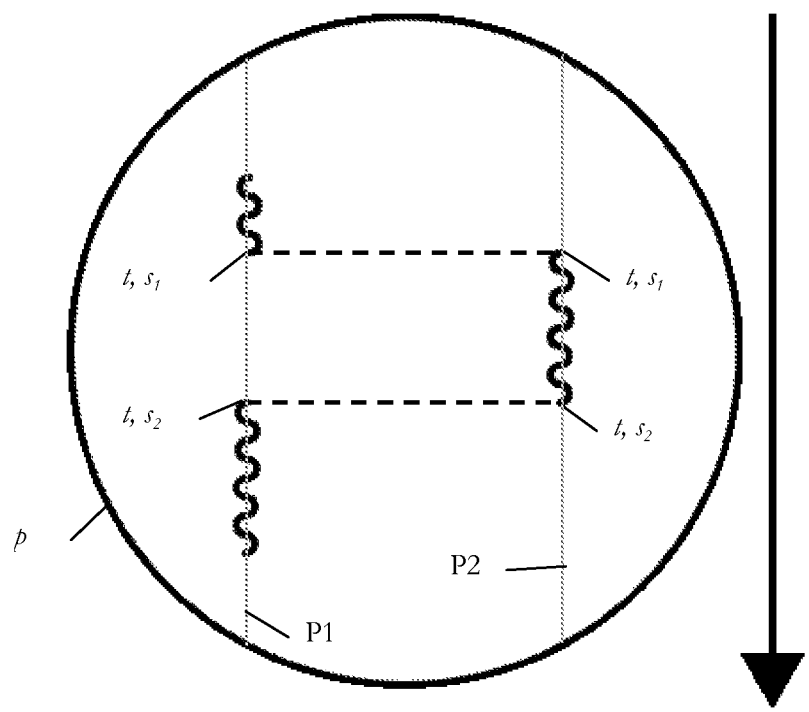
FIG. 3 illustrates schematically one embodiment of the suspension/continuation of a thread of execution.

This point is illustrated in FIG. 3. The y-axis is the timeline. The two parallel lines inside the circle denote a respective processor, P1 and P2. As implicit from the figure, the thread t belongs to a given process p. First, a thread t is started and executed at P1. At some point, the controller (not shown) detects that P1 is using resources closer to P2 and decides to interrupt the thread t, the processor P1 being in state s1. As discussed earlier, the thread t is then resumed at P2, starting from the state s1. Execution continues until the thread terminates or even, is interrupted at P2 (in state s2) to be imported back to P1, as illustrated in FIG. 3, and this, if the context makes it advantageous. Details as to thread management can for instance be found in the publication cited above, namely "Adaptive Data Placement in an Embedded Multiprocessor Thread Library."

Thus, embodiments of the present invention allow for moving computation state to memory instead of having a collection of hierarchical caches moving the data from main memory. As said, some embodiments of the method are performed under hardware control (the controller is embodied as a hardware circuit), for transparency to software.

Figure 4:
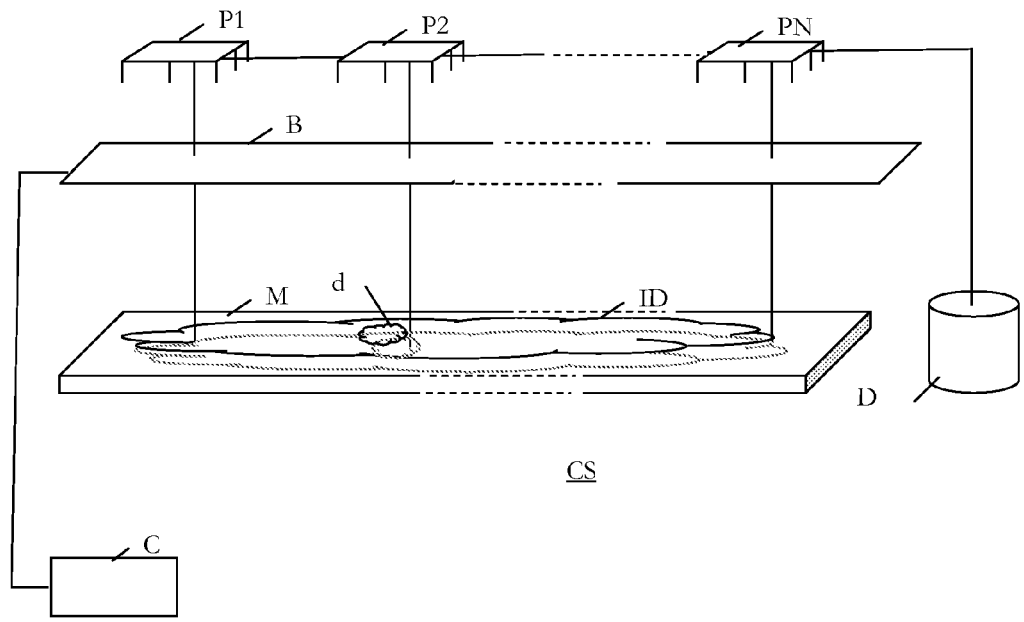
FIG. 4 is a schematic representation of a computer system implementing one embodiment of a method for managing processing resources of a computerized system.

FIG. 4 is a schematic representation of a computer system implementing one embodiment of a method for managing processing resources of a computerized system. Here processors P1-PN are connected to a memory M via suitable interconnects B, the latter comprising a bus B or a crossbar and possibly a switch. They are otherwise connected to a memory D (e.g. hard-disk), and under control of controller C. In a variant embodiment, switches are distributed, e.g. one switch per core or subset of cores. In still another variant embodiment, controller C is part of the interconnect. In all cases, the controller C is suitably coupled to processors and memory such as to be able to instruct to move execution from one processor to another.

In the depicted example, specific input data d is physically stored closer to the point where P2 accesses M than the point through which P1 accesses it. If, in operation, P1 turns to access d too often, the controller may want to move the P1 state to P2, resulting in less data moved.

Figure 5:
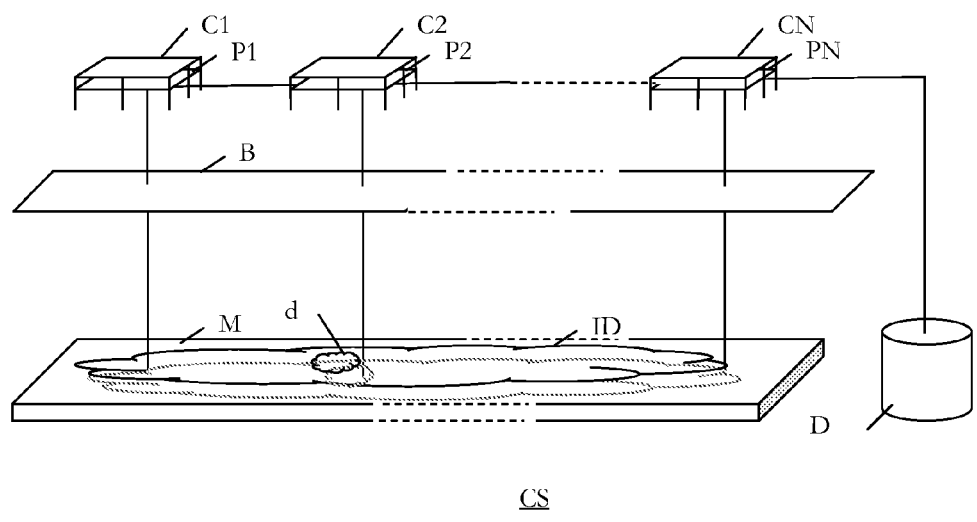
FIGS. 5 and 6 are variant embodiments to FIG. 4.

FIG. 5 is a variant embodiment to FIG. 4, wherein controllers C1-CN are distributed amongst the processors, e.g. one controller Cn per processor. Here, controllers may concurrently decide to move/receive processor states from one processor to another. A test based on monitoring input data, which is performed at C1, may thus lead to move P1 state to P2. C2 may then decide whether to accept, based on a current activity (or state) of P2. For instance, if P2 is inactive, then C2 confirms moving P1 state to P2. Similarly and as evoked, switches may be distributed.

Figure 6:
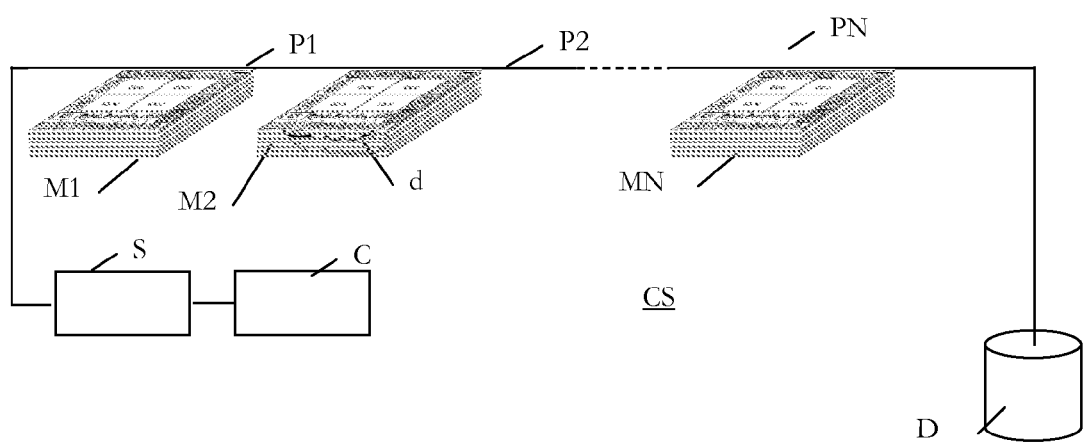

FIG. 6 is another variant embodiment to FIG. 4, wherein the memory now comprise at least two memory chips M1, . . . MN, each of the first and second processors P1, P2 being a processor core operatively interconnected to a chip M1, M2 of the memory, such as a DIMM, the controller interconnected to the processors via suitable interconnect.

More in details, the processors P1-PN are in some embodiments quad-core arrangement on top of respective 3D memory stack M1-MN, e.g. DIMM memory chips. The overall principle remains however the same: if, in operation, a first, given core of P1 (let call it P11), turns to access a given data d frequently, the controller may move the P11 state to one core of P2. A goal hereby achieved is to put a reasonable amount of computing very close to DRAM and exploit 3D stacking e.g. with 'through silicon via' (TSV) technology, leading to packages which are faster, smaller and consume less power, together with a truly distributed system.

Consider the following example setup, for the sake of illustration. Here, processor cores are on respective DIMM memory buffers. An application concerns for instance a database scan, wherein processors must inspect a large fraction of memory. The sequence of operations may for instance be the following:

First, the memory scans begin and counters monitor the memory accesses.

Second, a "lazy" migration code is began between the DIMMs (i.e. the controller instructs to start loading state data at a second processor core before instructing to interrupt execution at a first core); and Third, the controller triggers migration of a thread state and halts execution on the first core.

In some embodiments, the method at least partially solves the memory bandwidth problem, as well as memory capacity problems. The principles at the core of some embodiments of the method are furthermore inherently scalable. Also, since some embodiments of the method enable fewer levels of cache, they are therefore simpler in nature.

Finally, the approach proposed herein, although it may require adapting the OS and memory controller design in some cases, is transparent to at least some applications. Yet, adapting the OS is not inherently necessary. Furthermore, adapting the memory controller is to include additional hardware for e.g. monitoring accesses per core and for migrating execution from one processor to the other and this, when the controller is embodied as a hardware circuitry. However, in a "software" only implementation of the method, no adaptation is required.

In a soft implementation, instruction operations that the controller performs may be implemented in programs that are executable on a system including at least two programmable processors. Each computer program may be implemented in a high-level (e.g. procedural or object-oriented) programming language, or in assembly or machine language if desired; and in any case, the language may be a compiled or interpreted language. Suitable processors include, by way of example, both general and special purpose microprocessors. In another variant embodiment, instruction operations that the controller performs may be stored on a computer program product tangibly embodied in a machine-readable storage device for execution by a programmable processor; and method steps of the invention may be performed by a programmable processor executing instructions to perform functions of the invention. In all case, the present invention encompasses the resulting computer system.

More generally, embodiments of the above method may be implemented in digital electronic circuitry, or in computer hardware, firmware, software, or in combinations of them.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks or the like.

The present invention is advantageously applied to large computers, with up to thousands of processors, high-speed interconnects, and specialized hardware.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims. For example, the interruption/resuming principle disclosed herein may be implemented at another scale than the thread level.

What is claimed is:

1. A computer-implemented method for managing processing resources of a computerized system having at least a first processor and a second processor, each of the processors operatively interconnected to a memory adapted to store a set of data, the computer implemented method comprising:
   monitoring data of a set which are processed as at least one of input data or output data by the first processor while executing;
   if, based on the monitoring, the second processor is found to be at a shorter distance than the first processor from the monitored data, instructing to interrupt an execution at the first processor and resume the execution at the second processor; and
   wherein the distance is determined based on processing characteristics other than latency.

2. The computer-implemented method of claim 1, wherein at the step of instructing, it is further instructed to interrupt execution at the first processor, the first processor in a given processor state, and resume the execution at the second processor, starting from a processor state at least partly determined by the given processor state.

3. The computer-implemented method of claim 2, wherein at the step of instructing, it is further instructed to:
   load, in the second processor, state data capturing part or all of the said given processor state, and
   resume execution at the second processor according to the loaded state data.

4. The computer-implemented method of claim 3, wherein at the step of instructing, it is further instructed to start loading state data in the second processor before instructing to interrupt execution at the first processor.

5. The computer-implemented method of claim 4, wherein at the step of instructing, it is further instructed to start loading the state data based on data from at least one processor register of the first processor.

6. The computer-implemented method of claim 4, wherein the state data capture a subpart of the said given processor state, and wherein at the step of instructing, it is instructed to:
   start loading populated state data in the second processor, whereby part of data in at least one processor register of the second processor are kept unchanged; and
   resume execution at the second processor according to both the loaded state data and the data kept unchanged.

7. The computer-implemented method of claim 1, wherein the step of instructing to resume further comprises instructing to continue a thread of execution at the second processor after suspension of the thread at the first processor.

8. The computer-implemented method of claim 1, further comprising, after instructing to interrupt execution at the first processor, a step of instructing to maintain a processor state of the first processor until state data capturing at least part of a third processor state are instructed to be loaded in the first processor.

9. The computer-implemented method of claim 8, further comprising, after instructing to interrupt execution at the first processor, a step of instructing to turn off the first processor, after a temporization delay.

10. The computer-implemented method of claim 1, further comprising a step of instructing to write data of a first memory cache storing copies of data in the memory which are most frequently accessed by the first processor in a second memory cache used by the second processor.

11. The computer-implemented method of claim 1, the method implemented in a computerized system wherein the processors are operatively interconnected to the memory via an interconnect, monitoring data further comprising monitoring addresses of the processed data as stored on the interconnect.

12. The computer-implemented method of claim 1, wherein the distance from a given datum of the set of data to one of the first processor or the second processor is a function of a latency from the given datum as stored on the memory to the one of the first processor or the second processor.

13. A computer-implemented method for managing processing resources of a computerized system comprising a plurality of processors, amongst which a first processor and a second processor, each of the processors operatively interconnected to a memory adapted to store a set of data to be processed by a processor, the method comprising:
   monitoring data of the set which are processed as at least one of input data or output data by the first processor while executing; and
   if the second processor is a closer distance than the first processor to the monitored data, wherein the distance is determined based on processing characteristics other than latency, then instructing to
      interrupt an execution at the first processor, the first processor in a given processor state; and
      resume the execution at the second processor, starting from a processor state at least partly determined by the given processor state.

14. The computer-implemented method of claim 13, wherein at the step of instructing, it is further instructed to load, in the second processor, state data capturing at least part of the given processor state, and to resume execution at the second processor according to the loaded state data.

15. The computer-implemented method of claim 14, wherein at the step of instructing, it is further instructed to start loading the state data in the second processor before interruption of the execution at the first processor.

16. The computer-implemented method of claim 13, wherein at the step of instructing, it is further instructed to continue a thread of execution at the second processor after suspension of the thread at the first processor.

17. The computer-implemented method of claim 13, wherein the step of instructing further comprises instructing to transfer at least part of a first memory cache, storing copies of data which are most frequently accessed by the first processor, to a second memory cache used by the second processor.

18. The computer-implemented method of claim 17, wherein the first and second memory caches are the smallest caches used by the first processor and the second processor, respectively.

19. The computer-implemented method of claim 17, wherein the first and second memory caches are the sole memory cache used by the first processor and the second processor, respectively.

20. The computer-implemented method of claim 17, wherein neither of the first processor and second processor uses a memory cache.

21. The computer-implemented method of claim 17, implemented in a computerized system wherein processors are operatively interconnected to the memory via an interconnect, wherein monitoring data is processed by the first processor further comprising monitoring addresses of the processed data as stored on the interconnect, whereby a distance from the processed data to either the first processor or the second processor can be determined.

22. The computer-implemented method of claim 17, wherein the distance substantially corresponds to a measure of how far a processor is in space from the monitored data.

* * * * *